United States Patent [19]

Lillywhite

[11] 4,193,877
[45] Mar. 18, 1980

[54] APPARATUS FOR CLARIFYING LIQUID

[75] Inventor: Mitchell J. Lillywhite, Draper, Utah

[73] Assignee: Envirotech Corporation, Menlo Park, Calif.

[21] Appl. No.: 894,298

[22] Filed: Apr. 7, 1978

[51] Int. Cl.² ............................................ B01D 21/24
[52] U.S. Cl. .................................... 210/520; 210/525
[58] Field of Search ................... 210/83, 84, 519, 520, 210/525, 532 R, 532 S

[56] References Cited

U.S. PATENT DOCUMENTS

| | | | |
|---|---|---|---|
| 2,506,927 | 5/1950 | Kelly | 210/8 |
| 3,216,570 | 11/1965 | Cunetta | 210/83 |
| 3,371,788 | 3/1968 | Smith | 210/525 |
| 3,770,131 | 11/1973 | Davis et al. | 210/519 |
| 3,926,805 | 12/1975 | Walker | 210/519 X |

OTHER PUBLICATIONS

Type "SW" Series Sight Well Collectors.

*Primary Examiner*—William A. Cuchlinski, Jr.
*Attorney, Agent, or Firm*—Hal J. Bohner; Robert E. Krebs

[57] ABSTRACT

An apparatus for clarifying liquid waste having a tank with a center column mounted in its center and suction pipes to remove sludge which has settled to the floor of the tank. The center column is provided with an influent trough to introduce liquid waste into the tank, and ports are formed in the upper part of the column to introduce waste into the influent trough. The ports and the influent trough are located at about the level of the liquid in the tank so that the waste leaving the ports creates a radially outward current on the surface of the liquid in the tank to carry scum towards the periphery of the tank for collection.

9 Claims, 7 Drawing Figures

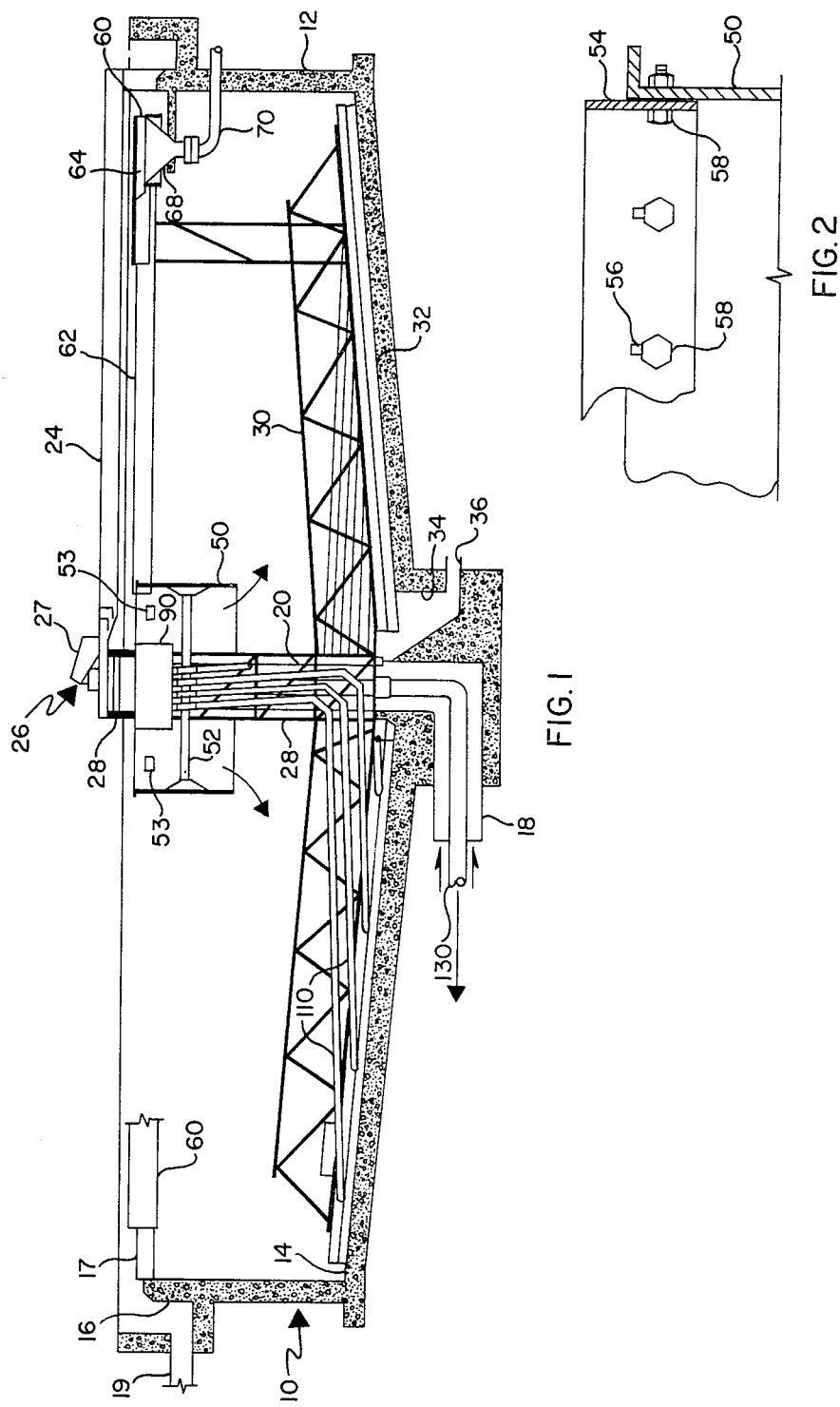

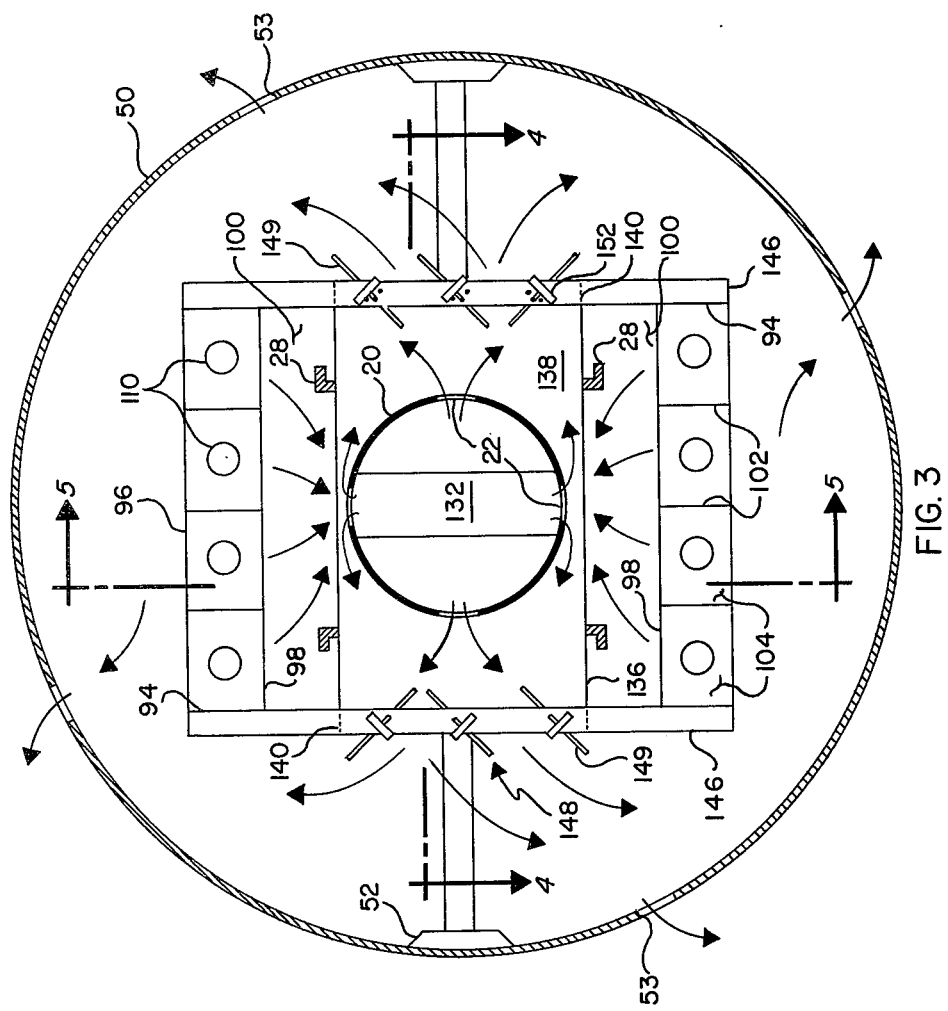

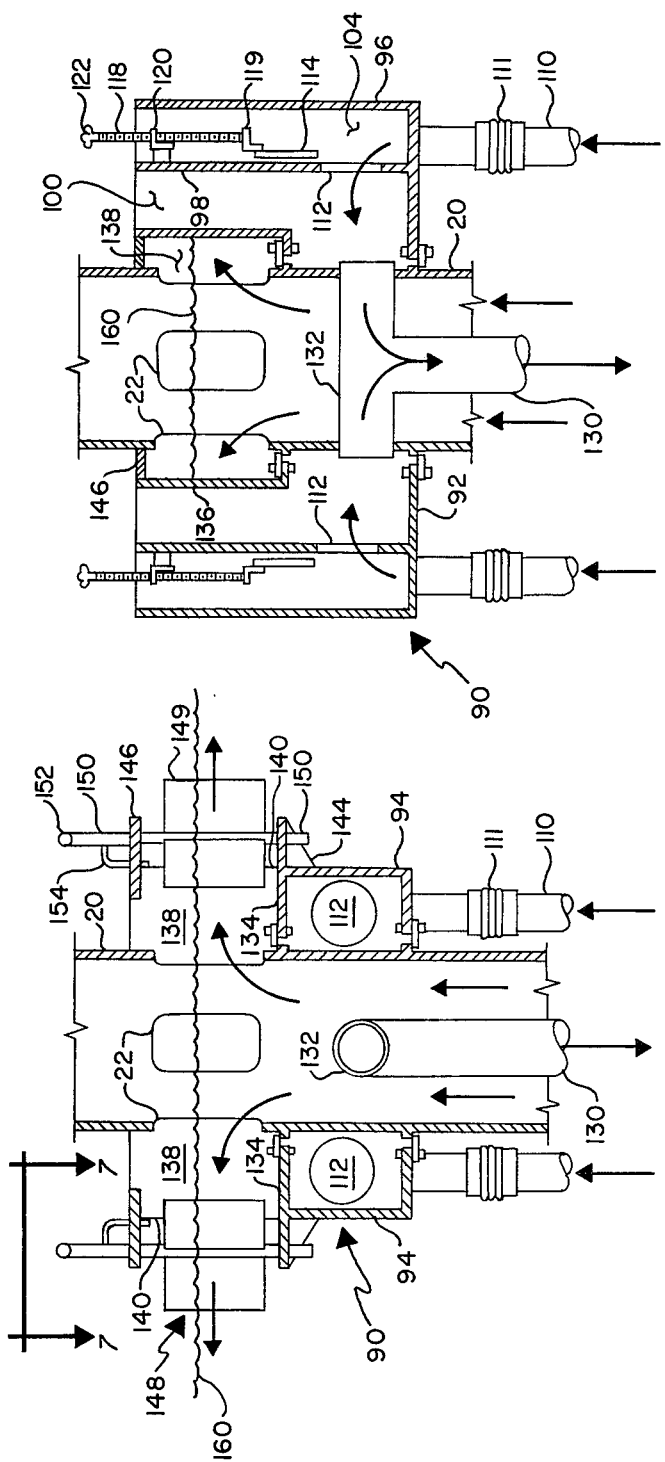

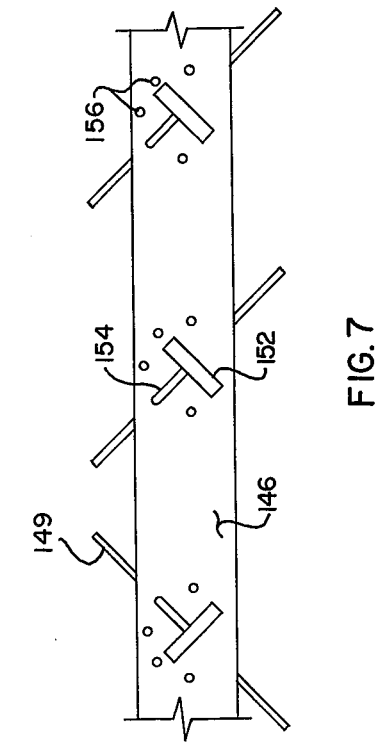
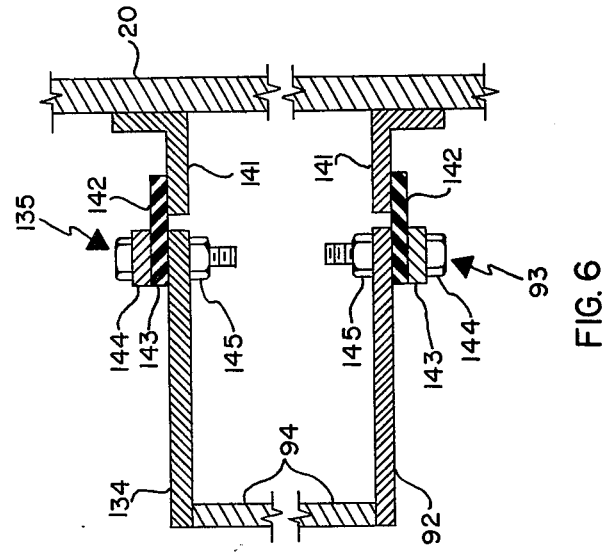
FIG. 7
FIG. 6

APPARATUS FOR CLARIFYING LIQUID

BACKGROUND OF THE INVENTION

1. Field of the Invention

This invention relates to ways and means to remove solid materials from liquid wastes.

2. State of the Art

Liquid wastes, such as sewage, from municipal and industrial sources often contain potential pollutants which must be removed before the waste can be disposed of in a receiving water such as a river or lake. It is current practice to remove pollutants from the liquid wastes by treating the waste in an activated sludge-type sewage treatment system.

In a conventional activated sludge-type system the liquid waste is introduced into a primary clarifier which includes a large tank. As the waste travels through the primary clarifier solid particles settle to the bottom of the tank to be removed and disposed of. The clarified waste flows from the tank to an aeration basin, which includes another large tank. Air is mixed with the waste by, for example, conventional surface aerators, as it flows through the aeration basin. The air mixed with the waste dissolves into the liquid, and micro-organisms in the waste utilize the oxygen from the dissolved air in metabolizing organic chemicals in the waste. As the micro-organisms consume oxygen and metabolize organic chemicals they multiply and cluster together so that when the waste leaves the aeration basin it contains particles which include micro-organisms. From the aeration basin the waste flows to a secondary clarifier wherein particles settle to form sludge which is removed, while clarified waste flows to a receiving water. The sludge which settles to the bottom of the secondary clarifier contains substantial quantities of micro-organisms and therefore it is generally termed activated sludge. In a conventional suction-type clarifier a plurality of suction pipes collect the sludge from the bottom of the tank. A part of the activated sludge is returned to the aeration basin, and in this way a high concentration of micro-organisms is maintained in the aeration basin. The remainder of the activated sludge is disposed of.

One type of conventional suction-type secondary clarifier includes a cylindrical tank having a bottom which slopes downward toward the center and a vertical sidewall having an effluent launder disposed around its circumference and near its top. The clarifier also includes a hollow column vertically disposed in the center of the tank for introducing sewage into the tank. Near the top of this center column is a sludge collection box which is connected in communication with a plurality of suction pipes and a draw-off pipe. The suction pipes extend downward from the collection box and radially outward so that their bottom ends are located near the bottom of the tank and spaced apart from one another along the diameter of the tank. The suction pipes and sludge collection box are connected to the center column, and a drive motor and gear system are coupled to rotate the center column, collection box and suction pipes. Thus, in operation the bottom openings of the suction pipes describe circles of different radii concentric to the center column.

The bottom of the sludge collection box is below the level of the surface of the liquid in the tank. Therefore when waste is being clarified in the tank there is a hydraulic head on the sludge on the tank bottom which forces the sludge up the suction pipes and into the collection box. From the collection box the sludge is carried by the draw-off pipe and returned to the aeration basin.

Turning now to the parts of the conventional suction-type clarifier used to introduce waste into the tank, the hollow center column has ports formed in its upper end below the sludge collection box. A cylindrical chamber is concentrically disposed around the upper part of the center column to form a first annular zone around the ports, and the chamber has a plurality of ports formed in its upper part. A cylindrical feedwell is disposed concentrically around the chamber to form a second annular zone which is in flow communication with the tank. In operation, waste flows upward through the center column, out the ports below the sludge collection box and thence into the first annular zone. The waste flows upward around the sludge collection box, through the first annular zone and thence out the ports in the cylindrical chamber and into the second annular zone. The waste then flows downward into the tank.

It should be appreciated that waste often contains grease, oil and other materials, collectively called scum, which float on water. Therefore in conventional practice a plurality of scum ports are formed in the side of the feedwell at the liquid level to permit the scum to flow radially outward from the feedwell to be collected by scum collection means located in the tank outside the feedwell. However, in the suction-type clarifier described above it has been found in practice that the flow pattern of waste introduced below the sludge collection box is not conducive to forcing scum outward through the scum ports, and often scum is trapped within the cylindrical chamber and the feedwell. The trapped scum becomes malodorous and must be removed manually.

OBJECTS OF THE INVENTION

An object of the present invention is to provide an improved suction-type clarifier wherein scum is not trapped in the feedwell.

Another object is to provide an improved means to collect the scum from the surface of the liquid in the clarifier.

Further objects and advantages of the present invention may be readily ascertained by reference to the following description and appended drawings which are offered by way of illustration only and not in limitation of the invention, the scope of which is defined by the appended claims and equivalents thereto.

BRIEF DESCRIPTION OF THE DRAWINGS

In the drawings:

FIG. 1 is a cross sectional view of a device according to the present preferred embodiment.

FIG. 2 is a detail of part of the device shown in FIG. 1, according to an alternative embodiment.

FIG. 3 is another detail of part of the device shown in FIG. 1.

FIG. 4 is a cross-section of the detail shown in FIG. 3 taken along line 4—4.

FIG. 5 is a cross-section of the detail shown in FIG. 3 taken along line 5—5.

FIG. 6 is a detail of the device shown in FIGS. 4 and 5.

FIG. 7 is a detail of the device shown in FIG. 4 taken along line 7—7.

DETAILED DESCRIPTION OF THE PREFERRED EMBODIMENT

The apparatus of FIG. 1 includes a hollow, cylindrical tank 10 having a vertical wall 12 and a flat floor 14 which slopes downward toward the center of the tank. Around the upper periphery of the wall 12 is disposed a trough or launder 16 to collect liquid which flows from the tank 10 over a weir 17. An influent pipe 18 is connected to the bottom of the tank to carry sewage thereinto. A discharge pipe 19 is connected to the launder 16 to convey clarified liquid from the tank 10 to a receiving water.

A vertical, hollow center column 20 is mounted in the center of the tank in communication with the influent pipe 18, and four influent ports 22 are formed in the center column 20 at the level of the top of the weir 17. The center column 20 is affixed to the floor of the tank, and at its top the center column 20 is affixed to a stationary bridge 24 which is connected to the tank wall 12. A drive unit 26 is mounted on the bridge 24 above the center column 20 and includes a motor 27 and gears, which are conventional and not shown. As will be discussed hereinafter, the drive unit 26 is coupled to a cage 28 to cause the cage to rotate. The cage 28 is comprised of vertically and angularly disposed structural members which are connected to the drive unit 26 and extend downward therefrom spaced apart from the center column 20 and almost to the floor 14. Two rake arms 30 are connected to the lower part of the cage 28 and extend along radii of the tank 10 parallel to the floor 14, and a plurality of scraper blades 32 are fixedly connected to the lower edges of the rake arms 30. It should be understood that in operation the drive unit 26 rotates the cage 28 causing the rake arms 30 to sweep over the floor 14, while the scraper blades 32 urge the sludge on the floor 18 to the center of the tank. A sludge pocket 34 is formed in the floor 14 to receive the sludge, and the sludge is removed from the pocket 34 via pipe 36.

A hollow, cylindrical feedwell 50 is affixed to the cage 28 by braces 52. The feedwell 50 is located near the top of the center column 20 and concentric thereto so that liquid introduced inside the feedwell from the center column 20 is directed downward into the tank 10. A plurality of scum outlet ports 53 are formed in the upper part of the feedwell 50 at the surface level of the liquid in the clarifier.

In practice the top of the feedwell 50 is generally located slightly above the level of the liquid surface, and it has been found that a sufficient current is generally provided through scum ports 53. However, in some circumstances it has been found desirable to locate the feedwell 50 with its upper edge below the surface of the liquid so that a current is formed to flow outward from the feedwell 50 over its upper edge. As shown in FIG. 2, when the feedwell 50 is located in this lowered position a cylindrical weir 54 is preferably affixed to the top of the feedwell 50 so the liquid can flow over the weir. Slots 56 are formed in the weir 54 and bolts 58 fitted through the slots so that the weir 54 can be positioned as desired.

A cylindrical baffle 60 is affixed to the wall 12 of the tank 10 at the level of the liquid in the tank so that scum is contained within the baffle 60. A skimmer blade 62 is mounted to the feedwell 50 and to one of the rake arms 30 to rotate with the rake arm 30 and collect scum floating on the liquid inside the baffle 60 and force it to a second skimmer blade 64 which urges the scum into a scum collection box 68 affixed to the baffle 60. A scum pipe 70 is connected to the collection box 68 to carry scum therefrom to disposal.

A rectangular collection and inlet box 90 is affixed to the upper part of the center column 20 immediately beneath the bridge 24. Referring now to FIGS. 3-7 the collection and inlet box 90 includes a non-foraminate, rectangular bottom plate 92 slidingly connected to the center column 20 near the upper part of the column via circular seal 93. The circular seal 93 is affixed to the center column and abuts the plate 92 in sliding relationship so that a liquid-tight seal is formed between the center column and the plate 92, and the plate is free to rotate.

The structural members comprising the cage 28 extend through and are affixed to the bottom plate 92. However, the cage 28 is not shown in FIGS. 4-7 for purposes of clarity. The collection and inlet box 90 further includes a pair of side walls 94 and a pair of end walls 96, each of which is vertical and sealingly connected to the bottom plate 92. Each side wall is also sealed to the two end walls adjacent thereto to form an open-topped box.

Parallel to each end wall 96 and interior thereof is an interior end wall 98 which extends between the two side walls 94 and is sealingly connected to the side walls. Each interior end wall 98 is sealingly connected to the bottom plate 92 and extends upward to the same height as the side walls. Each interior end wall 98 is spaced apart from the center column 20 so that a sludge collection zone 100 is formed therebetween. Three plates 102 are sealingly connected between each interior end wall 98 and each end wall 96 to form four sludge boxes 104. In practice, more or fewer than four sludge boxes 104 may be used.

When four sludge boxes 104 are used eight sludge pipes 110 are connected to the bottom of the collection and inlet box 90, one pipe 110 in communication with each sludge box 104. Each sludge pipe 110 is an L-shaped tube which extends downward from the collection and inlet box 90, bends near the floor of the tank, and extends along a radius of the tank. Flexible connections 111 form part of each pipe 110 to permit the pipe to flex. Four sludge pipes 110 are attached to each rake arm 30 and each pipe extends a different length along the rake arm 30 so that open ends of the pipes 110 are spaced apart from each other and are located near the bottom of the tank.

Eight ports 112 are formed in the lower part of interior end walls 98 to provide communication between the sludge boxes 104 and the sludge collection zone 100. Slideable control gates 114 are mounted to the interior end walls 98 to control the flow of sludge through the ports 112. The control gates 114 can be raised and lowered by threaded adjustment shafts 118 which are rotatably connected to the control gates 114 by L-braces 119 and connected to the interior sidewall 98 by L-brace 120 which is threaded. A key 122 is affixed to the top of each adjustment shaft 118 to permit it to be rotated from above to position the gates relative to the ports 112.

A sludge discharge pipe 130 is vertically disposed inside the influent column 20 and concentric therewith to carry sludge from the collection and inlet box 90. At the top of the sludge discharge pipe 130 is a tee 132 connected to the sides of the influent column 130 to provide communication between the sludge collection zone 100 and the discharge pipe 130.

Referring still to FIGS. 3–7, the sludge collection and inlet box 90 further includes a rectangular plate 134 rotatably connected to the center column 20 via a seal assembly 135. The plate 134 extends between the side walls 94 and is sealingly affixed to each and extends only a short distance toward the end walls 98. Two rectangular plates 136 are vertically disposed between the center column 20 and interior end walls 98 and sealingly connected along their bottom edges to the plate 134. The plates 136 extend upward to the same height as the tops of the side walls 94 so that an influent trough 138 is formed around the upper part of the influent column 20 in communication with influent ports 22. The structural members comprising the cage 28 are affixed to the plates 136 as shown in FIG. 3. However, the cage 28 is not shown in FIGS. 4–6 for purposes of clarity.

A rectangular port 140 is formed in each side wall 94 and extends in the vertical from slightly above the plate 134 to the upper part of each sidewall 94 and in the horizontal between the plates 136. Consequently, flow communication is permitted between the influent trough 138 and the interior of the feedwell 50.

The seal assemblies 135 and 93, best shown in FIG. 6, include two circular brackets 141 affixed to the center column 20 and spaced apart from the plate 92 and the plate 134 respectively. Two annular seal members 142 are located one beneath the plate 92 and one above the plate 134 to cover the space between the plates and the circular brackets 141. Two annular retaining rings 143 are located one above the upper seal member and one below the lower seal member both outside the space between the plates and the circular seal brackets 141 to cover a small part of the respective plates 92 and 134. A plurality of bolts 144 and nuts 145 are affixed through the plates 134 and 92 to hold the plates, the retaining rings 143 and the seal members 142 immobile relative to one another. It should be appreciated that the seal assemblies 135 and 93 permit free rotation of plates 92 and 134 relative to the center column 20 while maintaining liquid-tight seals between the plates and the center column 20.

A plate 146 is affixed to the top of each side wall 94 and extends the length thereof, and three brackets 144 are affixed to each sidewall 94 immediately below the ports 140 for mounting baffles 148. The baffles 148 include flat plates 149 affixed to rods 150 which are rotatably mounted in the brackets 144 and the plates 146. A horizontal bar 152 is affixed to the top of each rod 150 so that the baffles 146 can be rotatably positioned from above. One L-shaped pin 154 is affixed to the upper part of each rod 150, and a plurality of holes 156 are formed in the plate 146 to co-operate with the L-shaped pins 154. To position baffle 148 the baffle is raised so that the pin 154 disengages from a hole 156, and the baffle 148 is then rotated. When the baffle 148 is in the desired position it is lowered so that the pin 154 drops into a hole 156 thereby locking the baffle in position. It can be appreciated that the baffles 146 direct the flow of liquid from the influent trough 138, into the interior of the feedwell 50, and the baffles can be positioned to direct the flow of liquid as desired.

The operation of the present embodiment can now be appreciated. Liquid waste is introduced through the influent pipe 18 and flows upward through the center column 20. As best shown in FIGS. 3 and 4, the waste flows outward from the center column 20 through ports 22, through influent trough 138 and thence outward through ports 140. Baffles 148 direct the waste to flow, for example, in the direction indicated by the arrows. It should be appreciated that the ports 22 and 140 are located at about the level of the surface of the liquid 160 in the tank. Therefore the liquid waste flows from the center column 20 via ports 22 at substantially the same elevation as the level of the surface of liquid in the tank 10. And, consequently a substantially horizontal current is formed on the surface of the liquid inside the feedwell 50 so that scum is carried outward from the feedwell through scum ports 53. It should also be appreciated that the ports 22 and 140 are located above the plate 92, which forms the bottom of the sludge boxes 104. Therefore the flow of liquid is substantially horizontal from the center column 20 and into the feedwell 50. This should be contrasted with the conventional suction-type clarifier discussed above, wherein the wastewater is introduced below the scum boxes and flows upward around the boxes thereby creating currents which trap scum inside the feedwell.

Turning again to FIG. 1, in practice it has been found that the liquid in the tank outside the feedwell 50 often has a current which is circular in the direction of travel of the rake arms 30. Due to this current scum often travels ahead of the skimmer blade 62 and is not urged by that blade to the second skimmer blade 64; therefore the scum is often not completely collected in the collection box 68. It has been found that when the current inside the feedwell is circular in the direction opposite the current outside the feedwell this effect can be reduced or eliminated, thereby permitting substantial collection of the scum in the collection 68. Therefore, it should be appreciated that the baffles 148 are useful in promoting the collection of scum in the collection box 68. In practice the baffles 148 are preferably adjusted to establish a current inside the feedwell 50 which is in the opposite direction from the current outside the feedwell. Also, the baffles 148 aid in reducing the radial velocity of the waste thereby promoting settling of the sludge.

At the same time that scum is flowing through the scum ports 53, the primary flow is liquid from the ports 140 is radially outward and downward from the feedwell 50 and into the tank. Sludge settles to the floor 14 while the clarified sewage flows into the launder 16 and thence to a receiving water. Part of the sludge which collects on the floor 14 is forced by hydrostatic pressure into the sludge pipes 110 and thence into the sludge boxes 104. The drive unit 26 operates to cause the cage 28 and scrapers 32 to rotate, and scrapers 32 scrape the remainder of the sludge into sludge pocket 34 from whence it is transferred to disposal. The sludge in the boxes 104 flows into collection zone 100 and thence into the tee 132 while the control gates 114 regulate the rate of flow. From the tee 132 the sludge is carried by pipe 130 to be returned to the aeration basin.

I claim:

1. An apparatus for clarifying liquid waste comprising:
   a. a tank to contain the waste so that the surface of the waste is at a predetermined level;
   b. a center column mounted vertically on the floor of said tank;
   c. means for collecting sludge from the floor of said tank and removing the collected sludge from said tank, said sludge collecting means including at least one sludge box affixed to the upper part of said center column;

d. influent means connected to said center column for introducing the waste into said tank to be clarified, said influent means including at least one port formed in the center column at about the predetermined level of the waste in said tank to introduce waste into said tank so that the surface of the waste flowing from said at least one port is at substantially the same elevation as the predetermined level of the waste in said tank;

e. means for removing clarified waste from said tank; and, f. means for removing scum from said tank.

2. The apparatus of claim 1 wherein said at least one port is located above the bottom of said sludge box.

3. The apparatus of claim 1 further including baffle means adjustably connected to said influent means to cause the waste flowing from said at least one influent port to flow in a predetermined, controllable direction.

4. The apparatus of claim 1 wherein waste is not introduced from the center column below the bottom of said at least one sludge box.

5. The apparatus of claim 1 wherein said influent means includes an influent trough rotatably connected to said center column in communication with said at least one influent port.

6. The apparatus of claim 5 wherein said influent trough includes one bottom plate rotatably connected to said center column above the bottom of said sludge box and two side plates connected to said bottom plate.

7. The apparatus of claim 1 further including a feedwell connected to said center column and spaced apart from said center column.

8. The apparatus of claim 7 wherein the upper edge of said feewell is located above the predetermined level of the surface of the waste, and a plurality of scum ports are formed in the upper part of said feedwell.

9. The apparatus of claim 7 wherein the upper edge of said feedwell is located below the predetermined level of the surface of the waste, and a weir is connected to said feedwell.

* * * * *